United States Patent [19]

Mullins, Jr. et al.

[11] Patent Number: 5,941,557
[45] Date of Patent: Aug. 24, 1999

[54] AIR BAG COVER DOOR WITH TETHER

[75] Inventors: Everett Mullins, Jr., Huber Heights; Nicole M. Mahmood, Vandalia, both of Ohio

[73] Assignee: General Motors Corporation, Detroit, Mich.

[21] Appl. No.: 08/908,911

[22] Filed: Aug. 8, 1997

[51] Int. Cl.⁶ .................................................. B60R 21/16
[52] U.S. Cl. ........................................ 280/728.3; 280/732
[58] Field of Search ............................. 280/728.1, 728.2, 280/728.3, 731, 732

[56] References Cited

U.S. PATENT DOCUMENTS

| | | | |
|---|---|---|---|
| 3,109,701 | 11/1963 | Jacquet . | |
| 4,134,955 | 1/1979 | Hanrahan, Jr. et al. . | |
| 4,366,634 | 1/1983 | Giese et al. . | |
| 4,911,471 | 3/1990 | Hirabayashi | 280/732 |
| 5,326,523 | 7/1994 | Gustavel et al. . | |
| 5,335,939 | 8/1994 | Kuriyama et al. | 280/732 |
| 5,344,601 | 9/1994 | Newton . | |
| 5,385,366 | 1/1995 | Frank et al. | 280/728.3 |
| 5,398,959 | 3/1995 | Avila . | |
| 5,417,906 | 5/1995 | Chiodo . | |
| 5,419,475 | 5/1995 | Naritomi . | |
| 5,429,385 | 7/1995 | Kamiji et al. . | |
| 5,447,327 | 9/1995 | Jarboe et al. | 280/728.3 |
| 5,460,401 | 10/1995 | Gans et al. . | |
| 5,480,297 | 1/1996 | Ross . | |

*Primary Examiner*—Paul N. Dickson
*Attorney, Agent, or Firm*—Kathryn A. Marra

[57] ABSTRACT

An air bag cover door includes a cover substrate molded of a plastic material and a flexible fabric tether having a main body portion integrally molded directly into the plastic material of the cover substrate such that the main body portion of the tether is entirely and continuously integrally connected to the cover substrate. Preferably, the cover substrate includes an upper surface and the main body portion of the tether is integrally molded with the upper surface of the cover substrate to provide a substantially smooth and flush upper surface on the cover substrate for receiving a foam layer and skin thereon to provide a smooth and even decorative surface.

7 Claims, 4 Drawing Sheets

AIR BAG COVER DOOR WITH TETHER

TECHNICAL FIELD

This invention relates to a cover door for an air bag restraint system, and more particularly to a cover door including a tether for attachment of the cover door to a vehicle.

BACKGROUND OF THE INVENTION

It is well known in the prior art to provide an air bag restraint system in a vehicle. The air bag restraint system typically includes an inflator and an air bag for inflation upon discharge of gas by the inflator. It is known that the air bag restraint system may be mounted beneath an opening in an instrument panel through which the air bag deploys for protection of a vehicle passenger. Preferably, the instrument panel opening is normally closed by a cover door which is forced opened by the deploying air bag. The cover door covers the air bag restraint system during normal operation of the vehicle and may also be used to guide the air bag during deployment.

It is known in the prior art that the cover door may be connected to the vehicle, such as by connection to the instrument panel or to the air bag restraint system, by a tether which is attached to the cover door. The tether typically includes a main body portion which is attached to the cover door and end portions which extend out beyond the cover door and to the vehicle for anchoring the cover door. The connection of the tether to the cover door must be strong enough to withstand the forces of the opening cover door during air bag deployment. A conventional process for connecting the tether to the cover door includes providing a molded plastic cover substrate. A separate tether is cut to shape and laid over the cover substrate. The cover substrate may include a slot on each end through which respective end portions of the tether are fed. The tether is smoothed over the cover substrate as much as possible and then the tether is ultrasonically welded or heat staked to the cover substrate at numerous locations, for example such as eighteen for a single cover. Any openings in the cover substrates, such as those through which the tether ends extends or through which any other clips or brackets may need to extend, must be manually taped closed to avoid foam bleed-through in the next step of the process. Finally, the foam is molded over the tether on the cover substrate with a thin outer layer of thermoplastic or vinyl skin placed over the foam. Alternately, the tether may be laminated on the cover door between the cover substrate and an outer foam layer.

To better withstand the forces of the opening cover door during air bag deployment, the tether is preferably located on top of the cover substrate directly beneath the show surface of skin and foam. One difficulty in the prior art arrangement is that loose portions of the tether which are not staked to the cover substrate may bend or shift during the foaming process and been seen from the show surface. Thus, it will be appreciated that the taping, welding or heat staking, lamination, or movement of the tether itself may cause an uneven show surface in the final cover door when the foam and skin are placed over the cover substrate and tether. In addition, there is a concern with bleed-through of the foam at the slots through which the end portions of the tether extend and which are manually taped over in preparation for the foam and skin. Also, the prior art requires that the main body portion of the tether cover a substantially large portion of the cover door and that numerous attachment locations be provided to secure attachment of the tether to the cover substrate. In addition, the tether in the prior art is placed between the substrate and the outer foam layer and is not integrally connected to the cover substrate.

SUMMARY OF THE INVENTION

The present invention provides alternative and advantages over the prior art by providing a cover door which includes a tether that is integrally molded to the cover substrate of the cover door during the injection molding of the cover substrate. Advantageously, welding, heat staking or other manual attachment of the tether to the cover substrate does not need to be performed. Furthermore, the cover substrate and the tether are formed with a smooth upper surface which is free of loose fabric, tape and welds for a substantially smooth, continuous surface for receiving the foam and skin. Thus, the finished cover door has a smooth even appearance. Furthermore, no slots are needed in the cover substrate for extension therethrough of the end portions of the tether. Advantageously, since the tether is integrally molded to the cover substrate, the size of the main body of the tether can be decreased for a reduction in tether material.

These alternative and advantages are accomplished in the present invention by providing an air bag cover door for covering an air bag module in a vehicle. The cover door includes a cover substrate molded of a plastic material and a flexible fabric tether having a main body portion integrally molded directly into the plastic material of the cover substrate such that the main body portion of the tether is entirely and continuously integrally connected to the cover substrate. Preferably, the cover substrate includes an upper surface and the main body portion of the tether is integrally molded with the upper surface of the cover substrate to provide a substantially smooth and flush upper surface on the cover substrate for receiving a foam layer and skin thereon to provide a smooth and even decorative surface.

In accordance with other preferred aspects of the invention, the tether includes opposing tether end portions extending outwardly from the main body portion and extending freely from the cover substrate such that the end portions are attachable to the vehicle to anchor the cover door to the vehicle when the cover door is opened. The end portions are preferably integrally molded through the cover substrate from the upper surface and downwardly out through the bottom surface of the cover substrate such that the end portions extend out from the bottom surface of the cover substrate for attachment of the cover door to the vehicle.

Also preferably, the main body portion of the tether is made of a woven fabric having lengthwise fibers and widthwise fibers and wherein the main body portion of the tether includes a plurality of slits therein to selectively relieve the stress in the fibers. The slits are preferably generally L-shaped and are spaced about the main body portion of the tether to provide relief to at least one point on the majority of the fibers located on a center of the main body portion.

In accordance with further objectives of the invention, a method of making an air bag cover door includes the steps of providing a mold having an upper mold cavity and a lower mold core including a substantially flat mold surface, providing a tether having a main body portion and placing the main body portion of the tether against the mold surface, and closing the mold and injecting plastic into the mold to integrally mold the main body portion of the tether directly into the cover substrate for continuous connection thereto. Preferably, an upper surface of the cover substrate is molded against the mold surface and the main body of the tether is molded flushly with the upper surface of the cover substrate to provide a smooth, even upper surface for receiving decorative foam and skin.

DESCRIPTION OF THE PREFERRED EMBODIMENT

Figure 1:
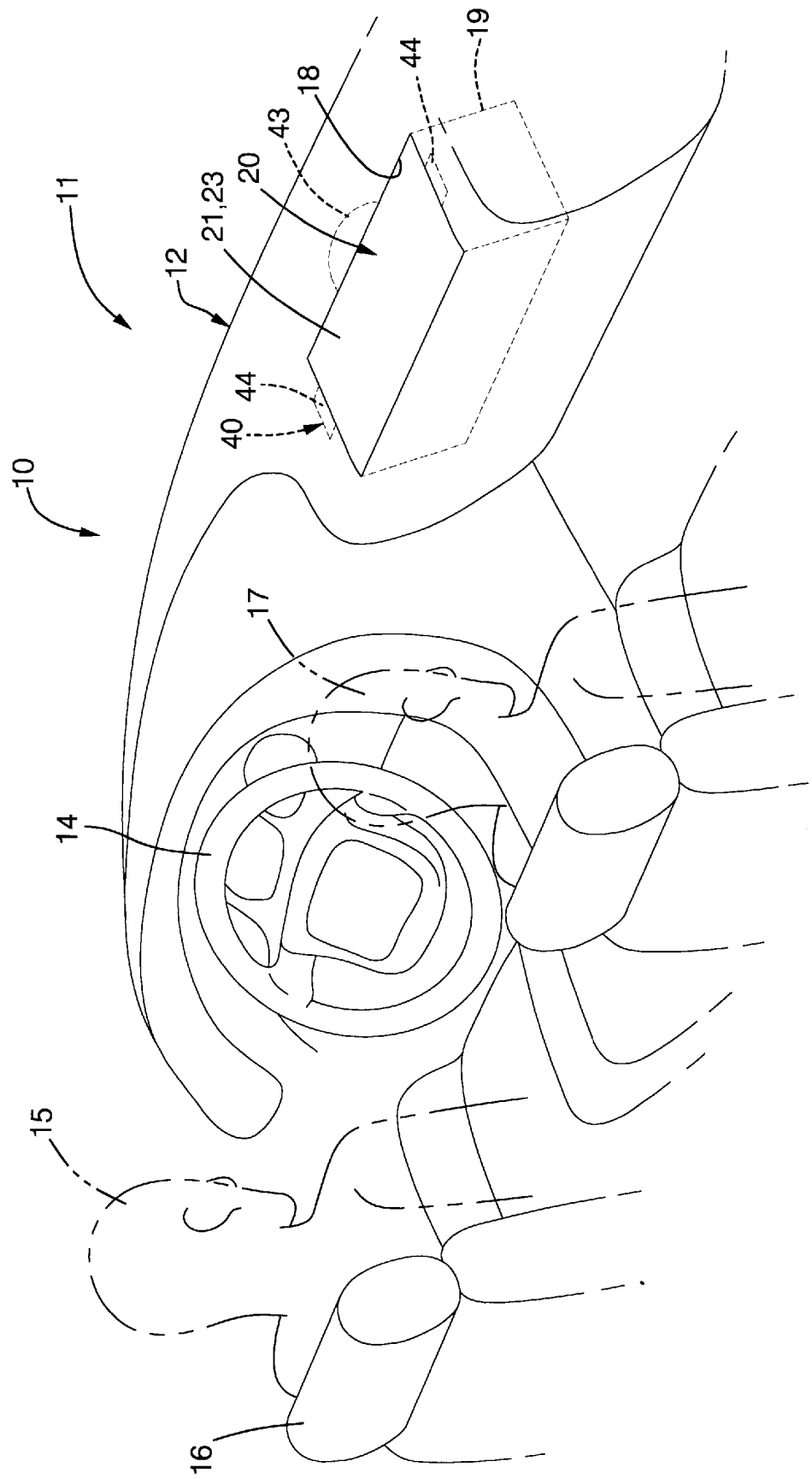
FIG. 1 shows a perspective view of a vehicle interior including a passenger side air bag cover door.

Referring to FIG. 1, a vehicle 11 includes a vehicle interior 10 having an instrument panel 12 including a steering wheel 14 mounted thereon forward of a vehicle driver 15 seated in a vehicle seat 16. A vehicle passenger 17 is seated in another vehicle seat 16 at a location rearward of the instrument panel 12. An air bag restraint module 19 is mounted beneath the instrument panel 12 at a location generally forward of the passenger 17. The air bag restraint module 19 preferably includes an inflator (not shown) for generating gas to inflate an air bag (not shown) under certain predetermined conditions for protection of the passenger 17. The instrument panel 12 includes an instrument panel opening 18 positioned generally above the air bag restraint module 19 to permit deployment of the inflating air bag therethrough. The instrument panel opening 18 is normally closed by an air bag cover door 20 during normal vehicle operation for covering the air bag restraint module 19. Upon air bag deployment, the cover door 20 is abruptly forced open by the inflating air bag and may be used to direct or guide the air bag during deployment.

Figure 4:
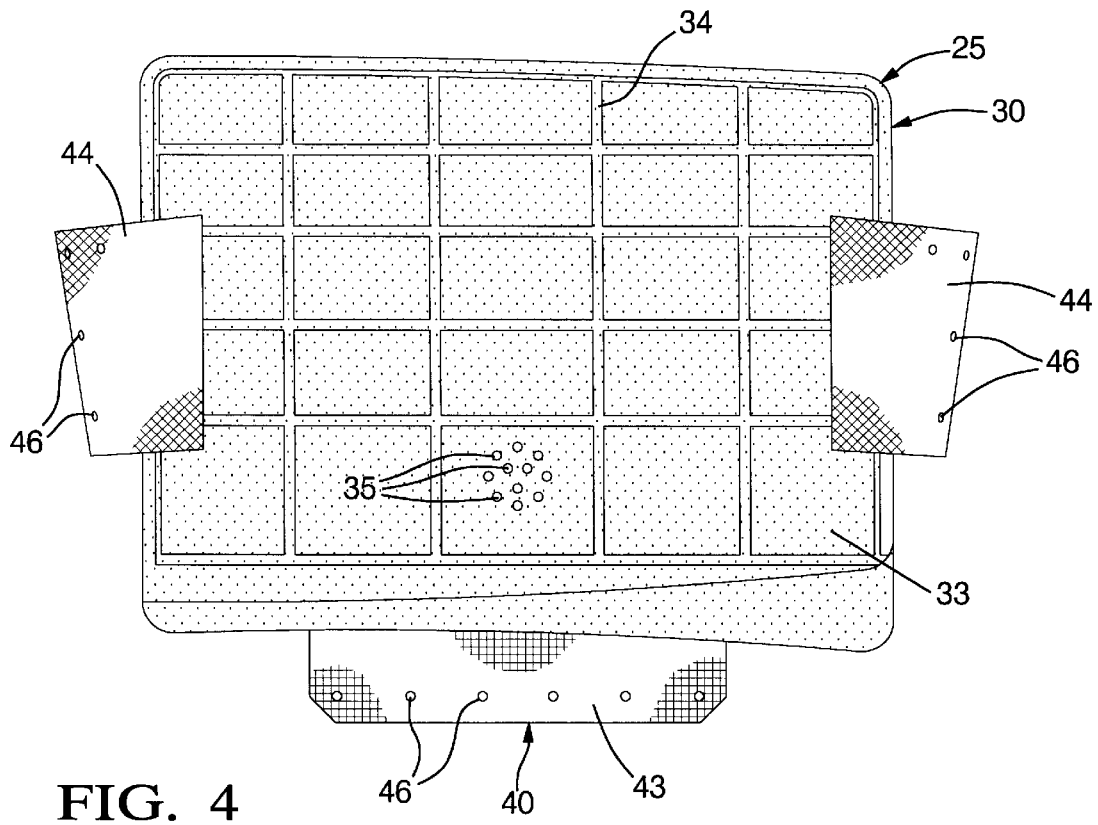
FIG. 4 shows a bottom plan view of a substrate assembly including the cover substrate with the tether molded therein.
Figure 5:
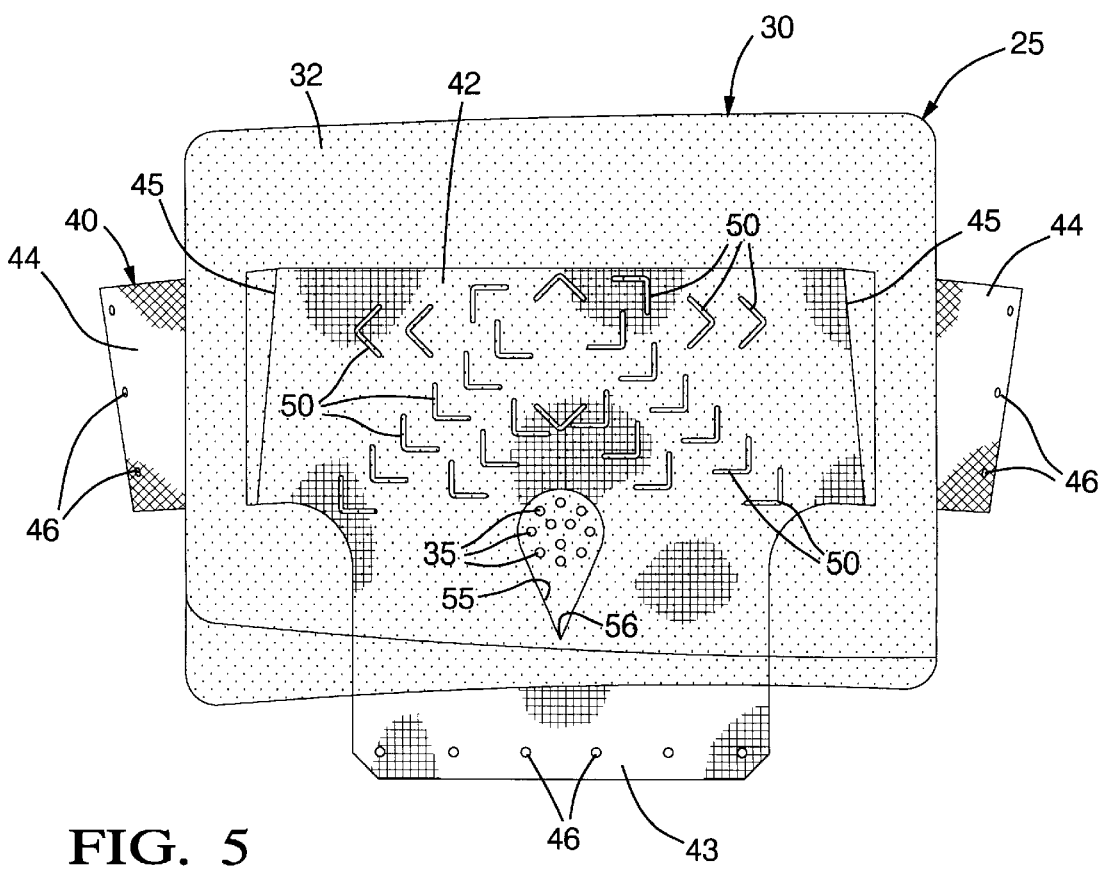
FIG. 5 shows a top plan view of the substrate assembly including the cover substrate with the tether molded therein.
Figure 7:
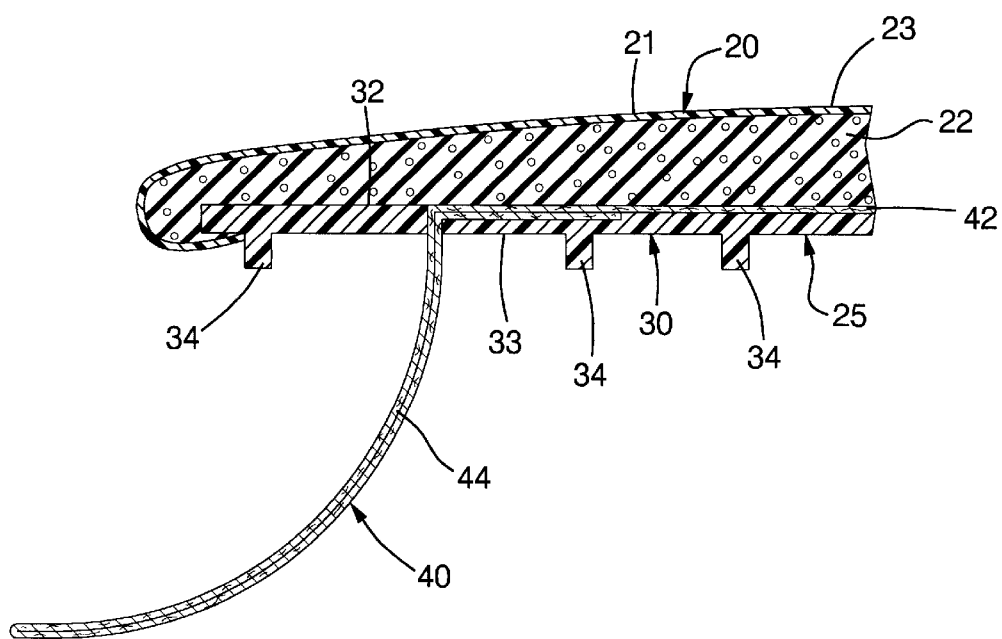
FIG. 7 shows a cross-sectional view of the finished cover door partially broken away and including the cover substrate and tether with the foam layer and skin in place.

In general, the cover door 20 includes a substrate assembly 25 as shown in FIGS. 4 and 5. The substrate assembly 25 includes a cover substrate 30 and a tether 40 which is advantageously integrally molded to the cover substrate 30, as described further hereinafter. As best shown in FIG. 7, the cover door 20 also preferably includes an upper show surface 21 formed by a foam layer 22 cover by an outer decorative skin 23, preferably being a thin layer of thermoplastic material or vinyl with texture and color to complement the instrument panel 12. The cover door 20 is suitably held in position within the instrument panel opening 18 in any suitable manner, such as by breakable portions (not shown) which release the cover door 20 when the air bag is deployed.

Figures 2, 3:
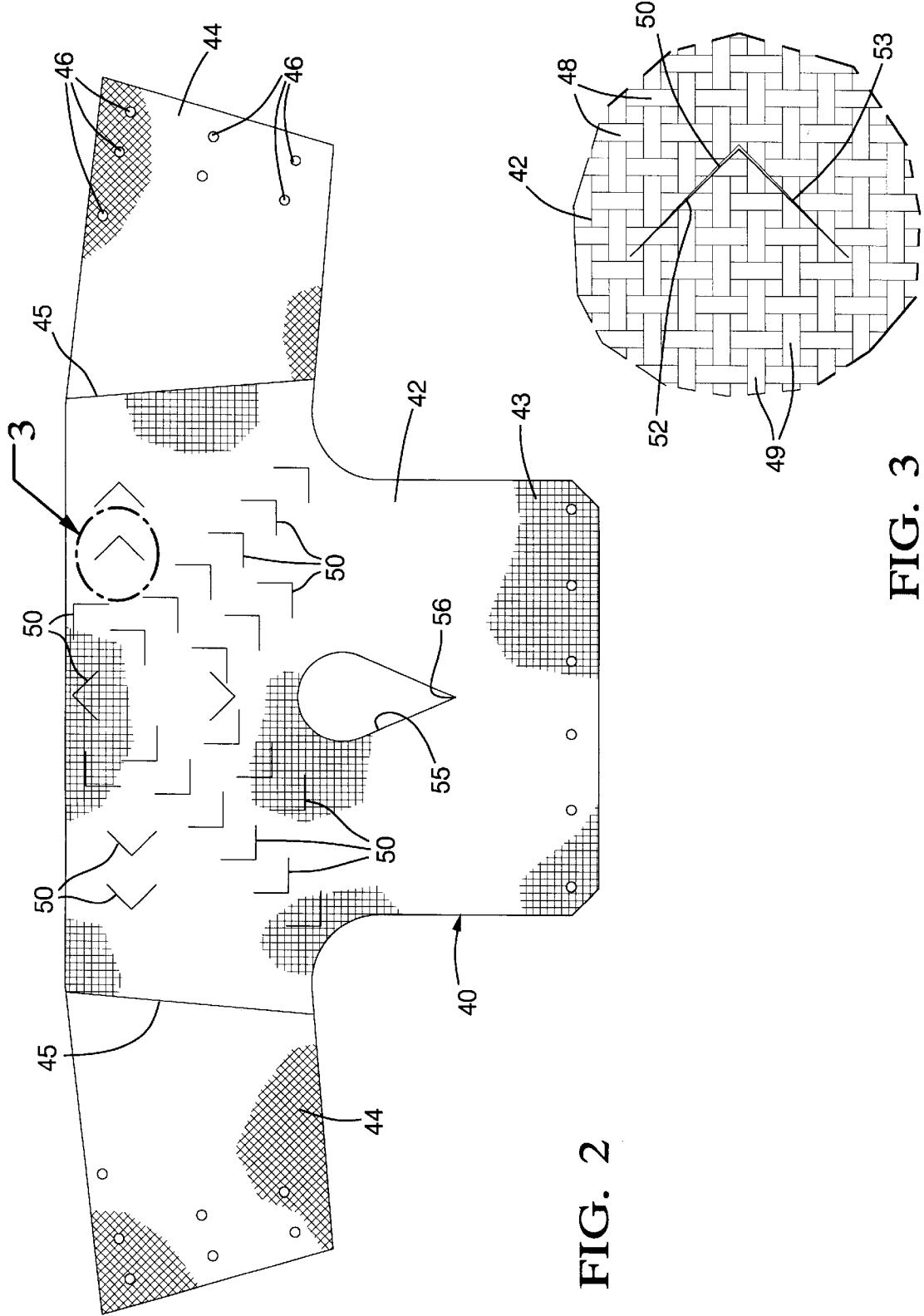
FIG. 2 shows a plan view of a tether prior to molding within a cover substrate.
FIG. 3 shows an enlarged portion of the tether as indicated at the encircled portion 3 on FIG. 2.

As best shown in FIGS. 2 and 3, the cover door 20 includes a flexible tether 40 which is preferably made of a woven coated fabric being a plastic material, such as nylon. The tether 40 includes a central main body portion 42 and opposing free end portions 44 extending laterally outward from the main body portion 42. The tether 40 also includes a hinge flap 43 which freely extends longitudinally outward from the main body portion 42. Preferably, the entire tether 40 is formed from a single piece of material cut to a generally T-shape and then folded over and stitched at stitch lines 45 to provide a double thickness at the tether end portions 44. Also preferably, the tether 40 is provided with a plurality of fastener holes 46 on the end portions 44 and on the hinge flap 43 for connection of the tether 40 and thus the entire cover door 20 to the vehicle 11. All or some of these fastener holes 46 can also selectively be used to hold the tether 40 in place during the molding process, as described further hereinafter. It will be appreciated that the end portions 44 and the hinge flap 43 of the tether 40 can be attached to any suitable structural portion of the vehicle 11, such as the instrument panel 12 or the air bag restraint module 19 by suitable fasteners (not shown) extending through fastener holes 46 or by any other suitable attachment means as is well known in the art.

As best shown in FIG. 3, the material forming the tether 40 preferably includes a plurality of lengthwise fibers 48 (fill) and widthwise fibers 49 (warp). Referring to FIG. 2, the main body portion 42 of the tether 40 includes a plurality of L-shaped and V-shaped slits 50 which are placed in a pattern on the tether 40 so as to try to place a relief or cut through a majority of the lengthwise and widthwise fibers 48, 49, particularly in the center of the main body portion 42. The slits 50 or cuts in the fibers 48, 49 have the advantage of relieving stress during molding of the tether 40 to the cover substrate 30 by allowing the material of the tether 40 to undergo thermal deformations at a different rate than that of the material forming the cover substrate 30, as described further hereinafter. Preferably, no material is removed from the tether 40 when the slits 50 are made such that surface area of the tether 40 is not decreased for attachment to the cover substrate 30. As shown in FIG. 3, the slits 50 each preferably include a first leg 52 and a second leg 53 which are preferably formed at right angles to each other. Each of the slits 50 preferably cuts about 5–10 rows of fibers 48, 49 and the legs 52, 53 have about equal lengths. Also, the relatively small and numerous slits 50 are distributed throughout the main body portion 42 of the tether 40 to selectively cut the fibers 48, 49 and reduce the possibility of the tether 40 shifting during the molding process, for example as opposed to making a few large cuts across the fibers 48, 49. In particular, it is desirable that at least one slit 50 or relief point be provided on each of the fibers 48, 49, especially on the majority of the main body portion 42 and especially at its center. In addition, the L-shaped slits 50 are advantageously staggered so that each L-shaped slit 48, 49 relieves stresses along staggered sets of fibers 48, 49 so that any one of the fibers 48, 49 does not have too many stress relief points on the same row. The slits 50 should be spaced apart from each other. Also, the use of numerous small slits 50 decreases the propensity of the tether 40 to shift from an upper surface 32 or inner surface molding side of the cover substrate 30 to the bottom surface 33 or outer surface molding side of the cover substrate 30 during the molding process. The relief provided by the slits 50 also reduces warpage of the substrate assembly 25. Since only the main body portion 42 of the tether 40 is attached to the cover substrate 30, slits 50 are not required on the end portions 44 and the hinge flap 43 which extend freely and outwardly from the cover substrate 30 after molding.

The tether 40 also preferably includes a foam pour hole 55 which provides an opening in the tether 40 through which foam can pass through during the later foaming process when the finishing the cover door 20. Preferably, the foam pour hole 55 has a teardrop shape having a narrowed tapered, pointed end 56 to reduce shifting of the tether 40 during molding, as opposed to a round hole. Thus, the pointed end 56 helps to keep the plastic material on the bottom surface 33 or outer surface molding side and enables the tether 40 to stay on the upper surface 32 or inner surface molding side of the cover substrate 30.

As best shown in FIGS. 4–7, the cover door 20 includes a cover substrate 30 which is preferably molded from a plastic material. Most preferably, the cover substrate 30 is formed of a polycarbonate/ABS blend which has a rate of thermal deformation which is different than that of the nylon fibers 48, 49 of the tether 40. The cover substrate 30 includes an upper surface 32 and a bottom surface 33. The bottom surface 33 preferably includes a plurality of integrally molded strengthening ribs 34 which are formed in a grid-like pattern as best shown in FIG. 4. As best shown in FIG. 5, the cover substrate 30 preferably includes a plurality of closely spaced foam holes 35 which are positioned within the foam pour hole 55 of the tether 40 for receiving foam therethrough to cover the upper surface 32 of the cover substrate 30 when finishing the cover door 20, as described further hereinafter.

Figure 6:
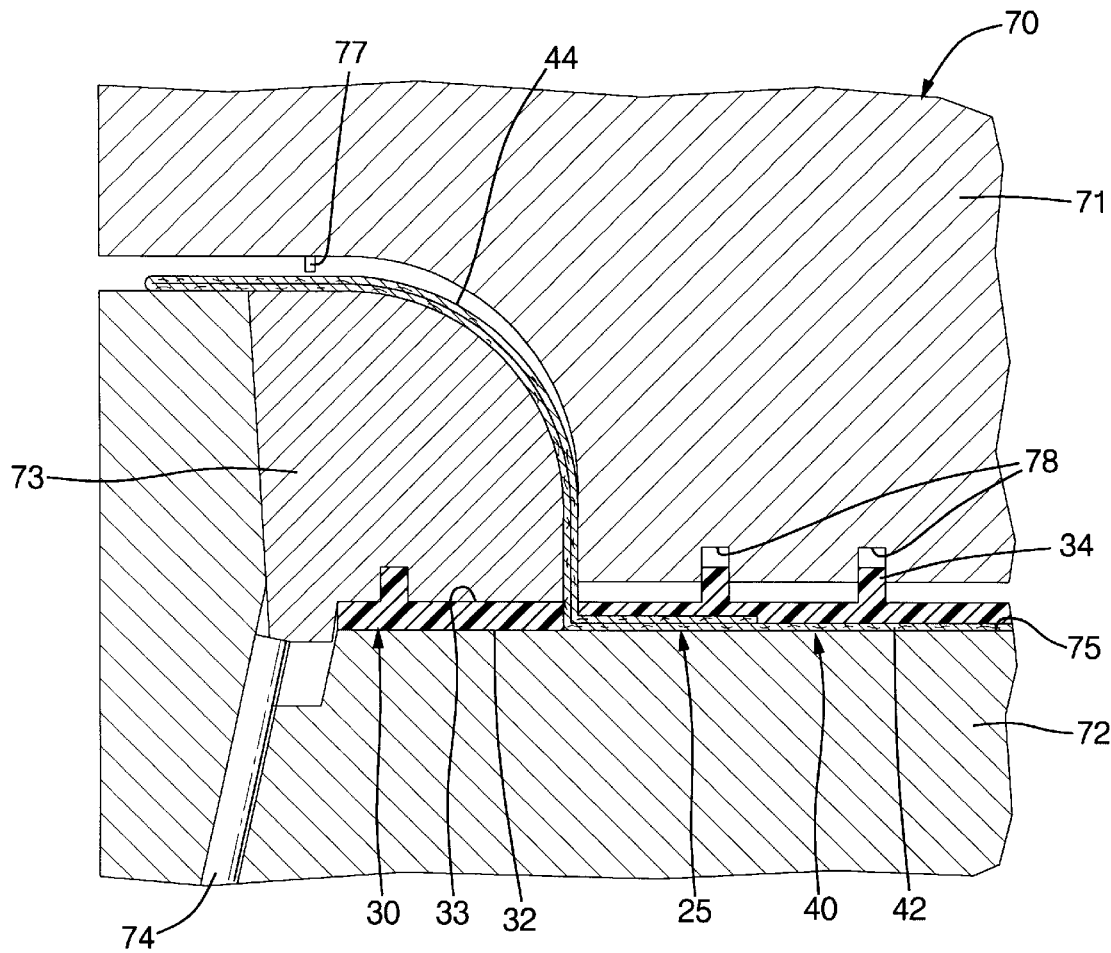
FIG. 6 shows a cross-sectional view of the cover substrate and the tether immediately following the molding process with the mold partially open.

Referring to FIGS. 4–6, the cover substrate 30 and the integrally molded tether 40 provide the substrate assembly 25 wherein the tether 40 is substantially smooth and flush with the upper surface 32 of the cover substrate 30. Referring to FIG. 6, the substrate assembly 25 is formed as follows. A mold 70 is provided having an upper mold cavity 71, a lower mold core 72, lifters 73 and lifter rods 74. The lifters 73 and lifter rods 74 assist with removal of the substrate assembly 25 from the mold 70 and help keep the end portions 44 and hinge flap 43 free from the cover substrate 30. Although the mold 70 is shown partially broken away, it will be appreciated that the mold 70 is preferably substantially symmetrical about its center. The tether 40 is placed over the mold core 72 such that the main body portion 42 of the tether 40 is located on the flat mold surface 75 of the mold core 72 whereby the main body portion 42 will be molded smoothly into the upper surface 32 of the cover substrate 30. The end portions 44 of the tether 40 are placed over the lifters 73 on opposing sides of the mold 70 such that the end portions 44 are positioned to extend out through the bottom surface 33 of the cover substrate 30 after molding and remain free of molded plastic material. Thus, the cover substrate 30 does not require slots through which the end portions 44 of the tether 40 extend. Instead, the end portions 44 are molded directly through the cover substrate 30. Furthermore it will be appreciated that a similar lifter arrangement may be used in providing the hinge flap 43 to keep it free of plastic during the molding process. However, as best shown in FIG. 5, the hinge flap 43 need not extend through the cover substrate 30, but preferably remains positioned even with the upper surface 32.

The upper mold cavity 71 preferably includes one or more tether 40 locating features, such as pins 77, for holding the tether 40 in place within the mold 70. It will be appreciated that the pins 77 may preferably extend through the fastener holes 46 of the end portions 44 of the tether 40. There are preferably several pins 77 on each side of the tether 40 to hold the tether 40 in place in the mold 70, even though only one pin 77 is shown. When the mold cavity 71 is closed onto the mold core 72, the pins 77 hold the tether 40 in place in the mold 70. Next, the plastic material forming the cover substrate 30 is injected into the mold 70 and fills the space between the mold cavity 71 and mold core 72 to form the shape of the cover substrate 30. The plastic material is preferably a polycarbonate/ABS blend. It will be appreciated that the mold cavity 71 preferably includes recessed portions 78 for integrally forming the ribs 34.

As best shown in FIG. 6, the mold cavity 71 is lifted and the completed substrate assembly 25 is removed from the mold 70. It will be appreciated that the substrate assembly 25 includes the tether 40 which is integrally molded into the cover substrate 30. Advantageously, the main body 42 of the tether 40 forms a substantially flat and smooth upper surface 32 with the cover substrate 30 since the fibers 48, 49 of the tether 40 are integrally merged with the plastic material of the cover substrate 30. It will further be appreciated that the entire main body portion 42 of the tether 40 is integrally molded with the cover substrate 30 for secure attachment of the tether 40 without the use of secondary operations such as welding, heat staking or laminating. Thus, less material can be used for the main body portion 42 of the tether 40 since the entire tether 40 is integrally and continuously connected to the cover substrate 30 as opposed to intermittent attachment locations shown in the prior art.

During the injection molding process, the nylon material of the tether 40 thermally deforms at a different rate than the plastic material of the cover substrate 30. Advantageously, the slits 50 reduce the stresses in the fibers 48, 49 such that the differences in thermal characteristics between the two materials does not cause the substrate assembly 25 to warp or twist. During the molding process, the fibers 48, 49 stretch apart at the slits 50 to relieve the stress in the fibers 48, 49 such that the substrate assembly 25 does not warp. Also advantageously, since slits 50 are relatively small and numerous, and are staggered on different rows of fibers 48, 49 the tendency of the injection molded plastic to push the tether 40 away from the flat mold surface 75 and to shift the tether 40 during molding are reduced. While the slits 50 are shown in a particular pattern in FIG. 5, it will be appreciated that numerous patterns may be used as long as the pattern of the slits 50 relieves the stresses in the majority of the fibers 48, 49, particularly in the center of the main body portion 42 of the tether 40.

After the substrate assembly 25 including the tether 40 and the cover substrate 30 is molded, the cover door 20 is finished as follows. Referring to FIG. 7, the outer skin 23 and foam layer 22 are preferably provided over the upper surface 32 to provide a decorative show surface 21 on the cover door 20 which preferably matches the color and texture of the instrument panel 12. Referring to FIGS. 5 and 7, the foam layer 22 is injected or poured through the foam holes 35 in the cover substrate 30 and the foam pour hole 55 in the tether 40 and the outer skin 23 is foamed in place over the foam layer 22. It will be appreciated that the cover substrate 30 with the molded-in tether 40 provides a smooth upper surface 32 onto which the foam layer 22 and skin 23 are mounted to provide a smooth decorative show surface 21 on the cover door 20. It will also be appreciated that a self-skinning urethane foam could be used.

Upon air bag deployment, the cover door 20 is pushed out of the instrument panel opening 18 for inflation of the air bag to protect the passenger 17. It will be appreciated that the cover door 20 pivots open about the hinge flap 43. In addition, the end portions 44 together with the hinge flap 43 limit the motion of the cover door 20 such that the cover door 20 may be used to guide the direction of the deploying air bag.

It will be understood that a person skilled in the art may make modifications to the preferred embodiment shown herein within the scope and intent of the claims. For example, although the cover door 20 is shown as closing an opening in the instrument panel 12, it will be appreciated that the cover door 20 of this construction could be used for covering any air bag restraint system at any location in the vehicle. While the cover door 20 is shown as preferably having two end portions 44 and a hinge flap 43, it will be appreciated that the cover door 20 may alternately include the hinge flap 43 only, a single end portion 44, or multiple hinge flaps 43 and end portions 44 and is not limited to the arrangement shown.

While the present invention has been described as carried out in a specific embodiments thereof, it is not intended to be limited thereby but is intended to cover the invention broadly within the scope and spirit of the appended claims.

What is claimed is:

1. An air bag cover door for covering an air bag module in a vehicle, the cover door comprising:

a cover substrate molded of a plastic material;

a flexible fabric tether having a main body portion integrally molded directly into the plastic material of the cover substrate such that the main body portion of the tether is entirely and continuously integrally connected to the cover substrate; and the main body portion of the tether being made of a woven fabric having lengthwise fibers and widthwise fibers and wherein the main body portion of the tether includes a plurality of slits therein to selectively relieve the stress in the fibers.

2. The cover door of claim 1 wherein the slits include first and second legs extending perpendicular to each other.

3. The cover door of claim 1 wherein the slits are spaced about the main body portion of the tether to provide relief to at least one point on the majority of the fibers located on a center of the main body portion.

4. The cover door of claim 1 wherein the slits are generally L-shaped and are staggered on differing rows of the fibers.

5. The cover door of claim 1 wherein the slits include numerous L-shaped and V-shaped slits.

6. The cover door of claim 1 wherein the slits include numerous relatively small L-shaped and V-shaped slits each cutting about 5–10 fibers.

7. An air bag cover door for covering an air bag module in a vehicle, the cover door comprising:

a cover substrate molded of a plastic material; and a flexible fabric tether having a main body portion integrally molded directly into the plastic material of the cover substrate such that the main body portion of the tether is entirely and continuously integrally connected to the cover substrate, and the cover substrate includes an upper surface and an opposite bottom surface and wherein the tether includes free end portions extending from the main body portion and wherein the main body portion of the tether is integrally molded with the upper surface of the cover substrate and wherein the end portions are integrally molded through the cover substrate from the upper surface and downwardly out through the bottom surface of the cover substrate such that the end portions extend out from the bottom surface of the cover substrate for attachment of the cover door to the vehicle.

* * * * *